2,734,065

11-KETO-21-IODOPROGESTERONE

John A. Hogg and Alan H. Nathan, Kalamazoo Township, Kalamazoo County, Mich., assignors to The Upjohn Company, Kalamazoo, Mich., a corporation of Michigan No Drawing. Application February 25, 1953, Serial No. 338,882

1 Claim. (Cl. 260—397.3)

The present invention relates to certain iodo steroids and is more particularly concerned with 11-oxygenated-21-iodoprogesterones and with a method for their production. This application is a continuation-in-part of our copending applications S. N. 262,193, filed December 17, 1951, and S. N. 267,939, filed January 23, 1952, both now abandoned.

The novel compounds of the present invention may be represented by the following structural formula:

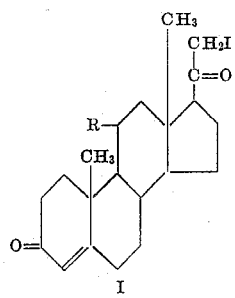

I wherein R is selected from the group consisting of an α-hydroxy group, a β-hydroxy group and a ketonic oxygen (=O).

The novel compounds of the present invention are prepared by condensing 11α-hydroxy, 11β-hydroxy, or 11-ketoprogesterone with an alkyl diester of oxalic acid in the presence of an organic solvent and in the presence of up to about one molar equivalent of an alkali-metal base to produce an 11-oxygenated-21-alkoxyoxalylprogesterone alkali-metal enolate which is then reacted with iodine followed by a base in the presence of water or an alkanol to produce an 11-oxygenated-21-iodoprogesterone of the present invention.

It is an object of the present invention to provide novel 11-oxygenated-21-iodoprogesterones. Another object of the present invention is the provision of a process for the production of novel 11-oxygenated-21-iodoprogesterones. Other objects will be apparent to those skilled in the art to which this invention pertains.

The novel compounds of the present invention are useful precursors to known and new steroids, being readily convertible to such physiologically active steroids as corticosterone and dehydrocorticosterone, as illustrated in detail hereinafter.

The novel compounds of the present invention may be represented by Formula I wherein R is α-hydroxy, β-hydroxy, or ketonic oxygen, i. e., 11α-hydroxy-21-iodoprogesterone, 11β-hydroxy-21-iodoprogesterone, and 11-keto-21-iodoprogesterone. The starting compounds of the present invention are 11α-hydroxyprogesterone [Peterson and Murray, J. Am. Chem. Soc., 74, 1871 (1952)], 11β-hydroxyprogesterone [Reichstein and Fuchs, Helv. Chim. Acta, 23, 684 (1940)], and 11-ketoprogesterone [Reichstein and Fuchs, Helv. Chim. Acta, 23, 684 (1940)].

The novel compounds of the present invention may be prepared by admixing 11α-hydroxyprogesterone, 11β-hydroxyprogesterone, or 11-ketoprogesterone with the selected alkali-metal base and dialkyl ester of oxalic acid in the presence of an organic solvent, the order of mixing being non-critical, to produce an alkali-metal enolate of an 11-hydroxy or 11-keto-21-alkoxyoxalylprogesterone which is then contacted with iodine followed by a base, preferably an alkali-metal hydroxide, in the presence of water or an alkanol to produce an 11-hydroxy or 11-keto-21-iodoprogesterone of the present invention.

Reaction solvents which can conveniently be employed in the glyoxalation step include benzene, toluene, xylene, and like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons and other aliphatic hydrocarbons, mixtures of these and other essentially non-reactive solvents. Benzene, with or without small percentages of added alkanol, is usually the preferred solvent.

The glyoxalation reaction is usually conducted at room temperature although temperatures between about zero degrees centigrade and the boiling point of the reaction mixture are also operative. However, when other than the methyl or ethyl ester of oxalic acid or when alkali-metal bases weaker than sodium methoxide or ethoxide are employed, temperatures substantially above room temperature may be required to obtain a satisfactory yield of 21-glyoxalated product.

The time necessary to obtain substantially complete reaction varies considerably between about one-half hour and several days, depending upon the reaction solvent, the reaction temperature, the selected dialkyl ester of oxalic acid, and the alkali-metal base employed, the moisture present in the reaction, and the molar ratios of the reactants. When sodium methoxide, methyl or ethyl oxalate, and benzene are employed at room temperature, the reaction is usually more than half completed in four hours and is usually complete in sixteen hours.

The glyoxalation step is usually carried out in the absence of any significant amounts of water in any form in the reaction, as would be expected in a reaction of this type. Usually the alkali-metal base, when it is an alkali-metal alkoxide, is prepared in situ by the solution of an alkali metal in an alkanol, although the commercial forms of sodium methoxide have been successfully employed. To ensure the essentially complete exclusion of water from the reaction mixture, the solvent is usually carefully dried with a drying agent such as, for example, anhydrous sodium sulfate, calcium sulfate, calcium chloride, phosphorous pentoxide, sodium, or the like, or when an aromatic hydrocarbon is used as the solvent, by distilling a portion of the solvent before using.

Since the reaction is a reversible one, i. e., the reaction product in the presence of a large amount of an alkanol such as methanol or ethanol and a catalytic amount of base may undergo alcoholysis to give starting material, the presence of a large amount of methanol or ethanol in the reaction mixture is usually not desirable although satisfactory amounts of product have been obtained using ethanol as the sole reaction solvent.

Alkali-metal bases within the purview of the present invention include the alkali-metal alkoxides, e. g., sodium methoxide, sodium ethoxide, sodium isopropoxide, potassium tertiary butoxide, lithium methoxide, and the like, the alkali metals, the alkali-metal hydrides and alkyl alkali metals, e. g., sodium amide, triphenylmethyl sodium, and the like. Of these, the alkali-metal alkoxides, especially sodium methoxide and sodium ethoxide, are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art. When up to about one molar equivalent of alkali-metal base is employed per mole of starting steroid, the above-described reaction is essentially a selective one, producing only 21-glyoxalated product. Use of substantially greater than molar equivalent amounts of alkali-metal base results in a substantial loss of the selective nature of the reaction and for this reason the reaction, for best results, should not be conducted in the presence of substantially more than about one molar equivalent of alkali-metal base. Best results are obtained with the use of about one molar equivalent of an alkali-metal base per mole of starting steroid.

The presence of substantially greater amounts than one molar equivalent of alkyl ester of oxalic acid, per mole of starting steroid, is usually advantageous and promotes rapid completion of the reaction. The reaction therefore is usually carried out in the presence of greater than about one molar equivalent of alkyl oxalate. Alkyl esters of oxalic acid which are conveniently employed in the process of the present invention include the lower-alkyl esters of oxalic acid, e. g., methyl oxalate, ethyl oxalate, and the propyl, butyl, isobutyl, amyl, hexyl, heptyl, and octyl esters of oxalic acid, and the like. Since the methyl and ethyl esters of oxalic acid appear to undergo condensation with the starting steroid the most rapidly, methyl oxalate and ethyl oxalate are usually employed.

The thus-produced alkali-metal enolate may be separated by the addition of a large volume of an organic solvent in which the alkali-metal enolate is insoluble, such as ether, pentane, or benzene, for example. Another method of producing a somewhat purer alkali-metal enolate comprises acidification of a cold aqueous solution of the thus-precipitated alkali-metal enolate to precipitate the free enol and then treating a solution of the free enol in ether or benzene with a chemical equivalent of sodium methoxide, thus reprecipitating the sodium enolate. When the glyoxalation is carried out in the presence of substantial amounts of methyl or ethyl alcohol, the removal of said alcohol by distillation at reduced pressure before the addition of an additional amount of solvent is preferred, if a high yield of precipitated product is desired. The free enols which may be obtained by acidification of an aqueous solution of an alkali-metal enolate are amorphous solids which do not appear to be crystallizable from the ordinary organic solvents.

The thus-produced alkali-metal enolates or free enols thereof are then converted, using usually about a molar equivalent of iodine followed by a base and an alkanol, to the novel 11-oxygenated-21-iodoprogesterones of the present invention, i. e., 11α-hydroxy-21-iodoprogesterone, 11β-hydroxy-21-iodoprogesterone, and 11-keto-21-iodoprogesterone.

Bases which may be used include the alkali-metal alkoxides, e. g., sodium methoxide, potassium isopropoxide, sodium ethoxide, lithium methoxide, or the like, potassium formate, sodium carbonate, sodium acetate, and others. Alkanols which may be used include methanol, ethanol, propanol, isopropyl alcohol, amyl alcohol and the like.

The 21-iodo compounds of the present invention are conveniently prepared by treating a methanolic solution of the selected alkali-metal enolate with a molar equivalent of iodine at a relatively low temperature, e. g., below zero degrees centigrade, to produce an 11-oxygenated-21-iodo-21-alkoxyoxalylprogesterone which is then contacted with a base, preferably an alkali-metal hydroxide, e. g., potassium hydroxide, in the presence of water or an alkanol, e. g., methanol, ethanol, etc., or a mixture of water and an alkanol, to produce an 11-oxygenated-21-iodoprogesterone of the present invention which may be precipitated by the addition of water to the mixture. Treatment of the iodo compounds of the present invention with a salt, usually an alkali-metal salt, of the selected hydrocarbon carboxylic acid, e. g., β-cyclopentylpropionic, trimethylacetic, dimethylacetic, benzoic, cyclopentylformic, or the like, is productive of the corresponding 21-acyloxy compounds, i. e., 11α-hydroxy-21-acyloxyprogesterone, 11β-hydroxy-21-acyloxyprogesterone and 11-keto-21-acyloxyprogesterone. A convenient method of producing and isolating said compounds comprises treatment of the precipitated 21-iodo compound with an acetone or alcoholic solution of the selected salt, e. g., sodium or potassium salt of the selected acid, at a temperature between about room temperature and the boiling point of the reaction mixture for from about one hour to several days, filtering the inorganic salts therefrom, and then distilling the solvent from the mixture.

The following examples are illustrative of the process and products of the present invention, but are not to be construed as limiting.

PREPARATION 1.—11α-HYDROXY-21-ETHOXYOXALYLPROGESTERONE AND THE SODIUM ENOLATE THEREOF

Three and three-tenths (3.3) grams (0.01 mole) of 11α-hydroxyprogesterone [Peterson and Murray, J. Am. Chem. Soc., 74, 1871 (1952)], was dissolved in a solution of 0.25 gram (0.0109 gram-atom) of sodium in eight milliliters of absolute ethanol and 1.46 grams (0.01 mole) of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus-produced was isolated by the addition of a large volume of ether as a yellow amorphous solid which decomposed above 200 degrees centigrade. The potassium enolate of 11α-hydroxy-21-ethoxyoxalylprogesterone is prepared by substituting potassium tertiary butoxide for the sodium methoxide used in the above-described reaction. Similarly, other 11α-hydroxy-21-alkoxyoxalylprogesterones and their alkali-metal enolates are prepared by substituting the selected alkyl diester of oxalic acid in the above-described reaction for the ethyl oxalate used therein.

11α-hydroxy-21-ethoxyoxalylprogesterone is prepared by the acidification with dilute hydrochloric acid of an aqueous solution of the thus-produced sodium enolate. Filtration of the precipitate, followed by a wash with water and drying in a vacuum desiccator, produces essentially pure 11α-hydroxy-21-ethoxyoxalylprogesterone.

PREPARATION 2.—11β-HYDROXY-21-ETHOXYOXALYLPROGESTERONE AND THE SODIUM ENOLATE THEREOF

One hundred and forty-four (144) milligrams (6.26 milligram-atoms) of sodium was dissolved in five milliliters of absolute ethanol under an atmosphere of nitrogen and to this solution was added eight milliliters of benzene and 0.8 milliliter (0.9 gram; 6.16 millimoles) of ethyl oxalate. The mixture was cooled in an ice-water bath and a solution of 1.99 grams (6.03 millimoles) of 11β-hydroxyprogesterone, dissolved in five milliliters of absolute ethanol and mixed with 25 milliliters of dry benzene, was added in a slow stream to the stirred solution. The reaction mixture was stirred at room temperature for 2.5 hours at the end of which time a 100-milliliter portion of ether was added followed by another 100-milliliter portion of ether one hour later. The thus-produced pale yellow precipitate of the sodium enolate of 11β-hydroxy-21-ethoxyoxalylprogesterone was filtered and washed with ether. The yield was 1.68 grams (62 percent).

The potassium enolate of 11β-hydroxy-21-ethoxyoxalylprogesterone is prepared by substituting potassium tertiary butoxide for the sodium methoxide used in the above-described reaction. Similarly, other 11β-hydroxy-21-alkoxyoxalylprogesterones and their alkali-metal enolates thereof are prepared by substituting the selected alkyl diester of oxalic acid for the ethyl oxalate used therein.

PREPARATION 3.—11-KETO-21-ETHOXYOXALYLPROGESTERONE AND THE SODIUM ENOLATE THEREOF

A solution of 3.37 milliliters (0.0115 mole) of a 3.12 Normal methanolic sodium methoxide solution, 0.45 milliliter of absolute ethanol, and twenty milliliters of benzene was distilled until about eight to ten milliliters of solvent had been removed and 1.34 milliliters (0.0092 mole) of ethyl oxalate and 7.5 milliliters of absolute ethanol were then added thereto, followed by the addition of a solution of 3.23 grams (0.01 mole) of 11-ketoprogesterone in 38 milliliters of benzene. The mixture was stirred for two hours at room temperature whereafter 55 milliliters of anhydrous ether was then added thereto followed one hour later by an additional 130 milliliters of ether. After stirring the resulting mixture for another hour, the resulting yellow precipitate was filtered from the supernatant liquid, washed with ether and dried to yield 3.12 grams of the sodium enolate of 11-keto-21-ethoxyoxalylprogesterone, a yield of 69 percent of the theoretical. The ethereal filtrate contained 1.26 grams of solid water-insoluble material which consisted in part of unreacted 11-ketoprogesterone. The sodium enolate was converted to the free enol, 11-keto-21-ethoxyoxalylprogesterone, by dissolving the thus-produced sodium enolate in water and acidifying with dilute hydrochloric acid, filtering the thus-precipitated nearly white enol and washing it with water. The dried enol weighed 2.54 grams, a yield of sixty percent of the theoretical, based on the starting 11-ketoprogesterone.

The potassium enolate of 11-keto-21-ethoxyoxalylprogesterone is prepared by substituting potassium tertiary butoxide for the sodium methoxide used in the above-described reaction. Similarly, other 11-keto-21-alkoxyoxalylprogesterones and their alkali-metal enolates thereof are prepared by substituting the selected alkyl diester of oxalic acid for the ethyl oxalate used therein.

*Example 1.—11α-hydroxy - 21 - iodoprogesterone and its conversion to 11α-hydroxy - 21 - acetoxyprogesterone (epicorticosterone acetate)*

The sodium enolate of 11α-hydroxy-21-ethoxyoxalylprogesterone was treated with iodine in methanol, followed by sodium methoxide to give 11α-hydroxy-21-iodoprogesterone, melting at 92–102 degrees centigrade, in forty percent yield.

Similarly, 11α-hydroxy-21-iodoprogesterone is prepared by substituting other 11α-hydroxy-21-alkoxyoxalylprogesterones as starting compounds or by substituting other alkali-metal alkoxides or hydroxides for the methanolic sodium methoxide used in the above-described reaction.

The thus-produced 11α-hydroxy-21-iodoprogesterone was then treated with sodium acetate in acetone to give 11α-hydroxy-21-acetoxyprogesterone, melting at 159 to 163 degrees centigrade and not depressing the melting point of an authentic sample obtained by the biooxygenation of 11-desoxycorticosterone acetate followed by the reacetylation of the 21-hydroxy group (Murray and Peterson, U. S. Patent 2,602,769, issued July 8, 1952).

11α-hydroxy-21-iodoprogesterone is also prepared by the following sequence of reactions: 11α-hydroxypregnane-3,20-dione (U. S. Patent 2,602,769, issued to Murray and Peterson July 8, 1952), is converted to 3,11,20-triacetoxy-3,20-pregnadiene by the action of isopropenyl acetate according to the method described in U. S. Patent 2,595,596, issued to Moffett May 6, 1952. 3,11,20-triacetoxy-3,20-pregnadiene is converted to 4,21-dibromo-11α-hydroxypregnane-3,20-dione by treatment with two molar equivalents of bromine in acetic acid followed by mild hydrolysis of the 11-acetoxy group with dilute hydrochloric acid. The thus-produced 4,21-dibromo-11α-hydroxypregnane-3,20-dione is converted by treatment with semicarbazide and pyruvic acid, according to methods known in the art, to 11α-hydroxy-21-bromoprogesterone which is converted, using sodium iodide in acetone, to 11α-hydroxy-21-iodoprogesterone.

*Example 2.—11β-hydroxy-21-iodoprogesterone and its conversion to 11β-hydroxy - 21 - acetoxyprogesterone (corticosterone acetate)*

The sodium enolate of 11β-hydroxy-21-ethoxyoxalylprogesterone was converted to 11β-hydroxy-21-acetoxyprogesterone (corticosterone acetate) in the following manner: 1.64 grams of the sodium enolate of 11β-hydroxy-21-ethoxyoxalylprogesterone, obtained in the manner described above, was dissolved in thirty milliliters of methanol and to the resulting solution was added three milliliters of water. To this mixture was added dropwise at room temperature a solution of 0.92 gram of iodine in 22 milliliters of methanol, the addition being completed in one-half hour. The dark brown reaction mixture was stirred for an additional hour at the end of which time there was added 1.1 milliliters of a 3.4 normal methanolic solution of sodium methoxide. The resulting yellow solution was stirred for ten minutes and then diluted with fifty milliliters of water which caused precipitation of 0.5 gram of brown product melting at 75 degrees centigrade to 85 degrees centigrade and decomposing into black material at 137 to 138 degrees centigrade. The filtrate was mixed with 300 milliliters of saturated aqueous sodium chloride solution and chilled in a refrigerator for two hours to give a yellow precipitate which was filtered and washed with water. The yield of dry 11β-hydroxy-21-iodoprogesterone, melting at 85 to 90 degrees centigrade and decomposing to a black material at 136 to 144 degrees centigrade, was 0.57 gram. The brown precipitate first obtained was chromatographed over Florisil (synthetic magnesium silicate). The fraction of 11β-hydroxy-21-iodoprogesterone which was eluted by a solvent mixture composed of nine parts of hexane hydrocarbons (Skellysolve B) to one part of acetone melted at 116 to 121 degrees centigrade with decomposition and was converted in a yield of 98 percent of theoretical to corticosterone acetate in the manner described below. Similarly, 11β-hydroxy-21-iodoprogesterone is prepared by substituting other 11β-hydroxy-21-alkoxyoxalylprogesterones or by substituting an aqueous solution of an alkali-metal hydroxide for the methanolic sodium methoxide in the above-described reaction.

A mixture of the 0.57 gram of 11β-hydroxy-21-iodoprogesterone obtained by precipitation with the saturated sodium chloride solution and chilling, one gram of potassium acetate dissolved in 2.5 milliliters of water, 25 milliliters of ethyl acetate, five milliliters of ethyl alcohol (3A) and about 0.6 milliliter of acetic acid was boiled with refluxing for three hours and then evaporated to dryness with a current of air at room temperature. The residue was washed with water and once more dried with a current of air, dissolved in benzene and chromatographed over forty grams of Florisil (synthetic magnesium silicate). The solvents, in 100-milliliter portions, and the order used, were as follows: benzene, benzene, six portions of hexane hydrocarbons (Skellysolve B) plus five percent acetone, six portions of Skellysolve B plus ten percent acetone, and six portions of Skellysolve B plus fifteen percent acetone. The first portion of Skellysolve B plus fifteen percent acetone eluate contained 65 milligrams of solids; the second, 106 milligrams; the third, 28 milligrams; and the remaining fractions contained from traces to fourteen milligrams of solids. The fractions weighing 65 milligrams and 106 milligrams were 11β-hydroxy-21-acetoxyprogesterone (corticosterone acetate) which melted at 138 to 143 degrees centigrade and 146.5 to 147.5 degrees centigrade, respectively. The melting point of this material was not depressed when taken with an authentic sample of corticosterone acetate and the structure thereof was confirmed by infrared analysis.

Similarly, 11β-hydroxy-21-iodoprogesterone is also prepared from 11β-hydroxypregnane-3,20-dione [Djerassi, J. Organic Chem., 17, 290 (1952)] through the sequence of reactions described in Example 1 for the conversion of 11α-hydroxypregnane-3,20-dione to 11α-hydroxy-21-iodoprogesterone.

*Example 3.—11-keto-21-iodoprogesterone and its conversion to 11-keto-21-acetoxyprogesterone*

A solution of 2.65 grams of the sodium enolate of 11-keto-21-ethoxyoxalylprogesterone in 25 milliliters of methanol was cooled to about minus twenty degrees centigrade in an ice-salt bath and a solution of 1.5 grams of iodine dissolved in 36 milliliters of methanol was added thereto with stirring, the addition being completed in about one hour. The mixture was then stirred for an additional 1.25 hours, whereafter 1.70 milliliters of a 3.4 Normal solution of sodium methoxide in methanol was added thereto. After stirring for an additional hour at zero degrees centigrade, 200 milliliters of water and forty grams of solid sodium chloride were added to the reaction mixture, thus precipitating reddish-brown 11-keto-21-iodoprogesterone which was then filtered from the reaction mixture, washed with water and without further purification converted to 11-keto-21-acetoxyprogesterone in the manner described below. Similarly, 11-keto-21-iodoprogesterone is prepared by substituting other 11-keto-21-alkoxyoxalylprogesterones or substituting an aqueous or alkanolic solution of an alkali-metal alkoxide or hydroxide for the methanolic sodium methoxide used in the above-described reaction.

To a mixture of thirty grams of potassium bicarbonate and eighteen grams of acetic acid was added the moist 11-keto-21-iodoprogesterone obtained as above followed by 200 milliliters of acetone. The mixture was refluxed for one hour and then allowed to stand at room temperature for three days. The inorganic material was removed by filtration and washed with acetone. The combined filtrate and washings were evaporated under reduced pressure and the residue dissolved in benzene and chromatographed over eighty grams of Florisil (synthetic magnesium silicate). The column was developed with 100-milliliter portions of solvents of the following composition and order: eleven portions of benzene, seven portions of ether, four portions of nine parts of ether to one part of acetone, seven portions of eight parts of ether to two parts of acetone, and finally one portion of acetone. The residues of the first three portions of eight parts of ether to two parts of acetone eluates were combined and recrystallized from ethyl acetate to a constant melting point of 181 to 182.5 degrees centigrade. The 11-keto-21-acetoxyprogesterone thus-produced was shown to be identical with an authentic sample by infrared analysis. 11-keto-21-acetoxyprogesterone is also prepared by the chromic acid oxidation of 11α-hydroxy-21-acetoxyprogesterone obtained according to the method described in Example 1.

In a similar manner as that described in Example 1, 2 or 3, other 21-acyloxy homologues and the like of the products produced therein are prepared by substituting an alkali-metal salt of the selected acid for the potassium acetate used therein. Compounds thus-produced include 11-keto-21-acyloxyprogesterones, 11α-hydroxy-21-acyloxyprogesterones, and 11β-hydroxy-21-acyloxyprogesterones wherein the acyloxy group is formyloxy, propionyloxy, butyryloxy, β-cyclopentylpropionyloxy, trimethylacetoxy, dimethylacetoxy, octanoyloxy, and the like.

11-keto-21-iodoprogesterone is also prepared from pregnane-3,11,20-trione [Reichstein, Helv. Chim. Acta, 26, 721 (1943)] through the sequence of reactions described in Example 1 for the conversion of 11α-hydroxypregnane-3,20-dione to 11α-hydroxy-21-iodoprogesterone.

It is to be understood that the invention is not to be limited to the exact details or exact compounds shown and described, as obvious modifications and equivalents will be apparent to one skilled in the art, and the invention is therefore to be limited only by the scope of the appended claim.

We claim:
11-keto-21-iodoprogesterone.

References Cited in the file of this patent

UNITED STATES PATENTS

| 2,554,472 | Ruschig | May 22, 1951 |
| 2,602,769 | Murray et al. | July 8, 1952 |

OTHER REFERENCES

Reichstein et al.: Helv. Chim. Acta. 23, 684–88 (1940).